US012713193B2

(12) United States Patent
Boretzki et al.

(10) Patent No.: US 12,713,193 B2
(45) Date of Patent: Aug. 18, 2026

(54) METHOD OF ESTIMATING NOISE ATTENUATION IN A HEARING DEVICE

(71) Applicant: SONOVA AG, Staefa (CH)

(72) Inventors: Michael Boretzki, Rüti (CH); Sofie Jansen, Zürich (CH); Benjamin Scholz, Stäfa (CH); Hans-Ueli Roeck, Hombrechtikon (CH); Markus Hofbauer, Hombrechtikon (CH); Daniel Probst, Uerikon (CH)

(73) Assignee: Sonova AG, Staefa (CH)

( * ) Notice: Subject to any disclaimer, the term of this patent is extended or adjusted under 35 U.S.C. 154(b) by 129 days.

(21) Appl. No.: 18/761,560

(22) Filed: Jul. 2, 2024

(65) Prior Publication Data

US 2025/0016513 A1 Jan. 9, 2025

(30) Foreign Application Priority Data

Jul. 3, 2023 (EP) .................................... 23183069

(51) Int. Cl.
*H04R 25/00* (2006.01)

(52) U.S. Cl.
CPC ........... *H04R 25/70* (2013.01); *H04R 25/505* (2013.01); *H04R 2225/025* (2013.01)

(58) Field of Classification Search
CPC .............. H04R 2225/025; H04R 25/70; H04R 2225/43; H04R 2225/023; H04R 25/505; H04R 25/30; H04R 2225/41
See application file for complete search history.

(56) References Cited

U.S. PATENT DOCUMENTS

| | | | |
|---|---|---|---|
| 7,082,205 | B1 | 7/2006 | Westermann |
| 2004/0204921 | A1 | 10/2004 | Bye et al. |
| 2019/0289409 | A1 | 9/2019 | Greenberg et al. |

FOREIGN PATENT DOCUMENTS

EP 3783921 A1 * 2/2021 ............. H04R 25/70

OTHER PUBLICATIONS

European Search Report and Written Opinion received Dec. 14, 2023 in European Application No. EP23183069.6.

* cited by examiner

*Primary Examiner* — Kile O Blair
(74) *Attorney, Agent, or Firm* — ALG Intellectual Property, LLC

(57) ABSTRACT

The disclosure relates to a method of operating a hearing device configured to be at least partially inserted into an ear canal of a user, the method comprising receiving an input audio signal; amplifying the input audio signal; and outputting, by an output transducer included in the hearing device, an output audio signal based on the amplified audio signal so as to stimulate the user's hearing.

15 Claims, 4 Drawing Sheets

METHOD OF ESTIMATING NOISE ATTENUATION IN A HEARING DEVICE

RELATED APPLICATIONS

The present application claims priority to EP Patent Application No. 23183069.6, filed Jul. 3, 2023, which is hereby incorporated by reference in its entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by an input transducer such as a microphone or a microphone array. The reproduced sound may be amplified to account for a hearing loss, such as in a hearing instrument, or may be output without accounting for a hearing loss, for instance to provide for a faithful reproduction of detected ambient sound and/or to add audio features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device. A hearing system may also comprise a hearing device, e.g., a single monaural hearing device or a binaural hearing device, and a user device, e.g., a smartphone and/or a smartwatch, communicatively coupled to the hearing device.

Hearing devices are often employed in conjunction with communication devices, such as smartphones or tablets, for instance when listening to sound data processed by the communication device and/or during a phone conversation operated by the communication device. More recently, communication devices have been integrated with hearing devices such that the hearing devices at least partially comprise the functionality of those communication devices. A hearing system may comprise, for instance, a hearing device and a communication device.

In recent times, some hearing devices are also increasingly equipped with different sensor types. Traditionally, those sensors often include an input transducer to detect a sound, e.g., a sound detector such as a microphone or a microphone array. An amplified and/or signal processed version of the detected sound may then be outputted to the user by an output transducer, e.g., a receiver, loudspeaker, or electrodes to provide electrical stimulation representative of the outputted signal. In an effort to provide the user with even more information about himself and/or the ambient environment, various other sensor types are progressively implemented, in particular sensors which are not directly related to the sound reproduction and/or amplification function of the hearing device. Those sensors include inertial sensors, such as accelerometers, allowing to monitor the user's movements. Physiological sensors, such as optical sensors and bioelectric sensors, are mostly employed for monitoring the user's health.

In order to determine the performance of a hearing device to assist in compensating for a hearing loss of a hearing impaired person, various device characteristics can be measured. Those characteristics can comprise a "real ear occluded gain" (REOG) indicative of a property of sound inside side the ear canal in a situation in which the hearing device is inserted into the ear canal but abstains from outputting an output audio signal into the ear canal. The REOG measure can be employed to estimate an acoustic coupling of the hearing device, e.g., an amount of ambient sound directly entering the ear canal when the hearing device is inserted into the ear canal. To illustrate, a rather open acoustic coupling would allow the ambient sound to directly enter the ear canal to a larger extent without being blocked by the hearing device, whereas a rather occluded or sealed acoustic coupling would block the ambient sound to a larger extent from entering the ear canal as compared to the open coupling. E.g., the REOG measure may be indicative of a transfer function between a sound pressure level (SPL) in a free field (SPL FF) and a sound pressure level in front of the ear drum (SPL RE), which may also be referred to as at a real ear (RE), when the hearing device is inserted into the ear canal and abstains from outputting the output audio signal into the ear canal. A related measure is the "real ear occluded response" (REOR) indicating the sound pressure level in front of the ear drum (SPL RE) when the hearing device is inserted into the ear canal but switched off.

Another characteristic of the hearing device to assist in compensating for hearing loss is a "real ear aided gain" (REAG) indicative of a property of sound inside the ear canal in a situation in which the hearing device is inserted into the ear canal and outputs the output audio signal based on the amplified input audio signal into the ear canal. E.g., the REAG measure may be indicative of a transfer function between the SPL FF and the SPL RE when the hearing device is inserted into the ear canal and outputs the output audio signal into the ear canal. A related measure is the "real ear aided response" (REAR) indicating the SPL RE when the hearing device is inserted into the ear canal and switched on.

Those characteristics can be evaluated, e.g., by a health care professional (HCP) and/or in an automated way by a dedicated fitting software, to suggest and/or implement improvements with regard to the hearing device performance when compensating for a given individual hearing loss. For instance, the acoustic coupling and/or the amplification of the input audio signal can be optimized depending on those characteristics.

Generally, during a fitting of the hearing device to the individual needs of a user, a gain model can be adjusted. In particular, in modem hearing aids, a momentary gain can depend on an momentary input level of an input audio signal. The gain model contains information which gain is active with which input level. E.g., a reference measurement condition for the gain may be determined via an acoustic coupler such as an 2 cc coupler or other suitable coupler. In a fitting system, a desired gain of the coupler may be programmed to a gain model of the hearing aid, e.g., as long as the gain is within predetermined gain boundaries of a specific hearing aid. For serving a hearing impaired human, the gain may be transformed into the REAG. Such a conversion may depend on the receiver of the hearing aid and/or on individual ear canal properties and/or how the hearing aid is coupled to the ear. E.g., such a conversion known in the art is called ear-to-coupler level difference (ECLD). Thus, for different ear canal properties and/or different acoustic couplings, the REAG and/or ECLD can differ by a large amount for a given gain. Similarly, also the REOG can depend on the acoustic coupling and ear canal properties.

Some other examples of providing an estimate of the REOG measure and/or the REAG measure are disclosed in Swiss patent application publication No. CH 707 585 A2.

Yet another parameter of the hearing device performance, however, is related to an attenuation of noise contained in the input audio signal such as, e.g., an indicator of how much headroom of stronger noise attenuation would be possible in a given hearing situation. Obtaining such information about a possible improvement of the noise attenuation in the outputted audio signal would be highly desirable not only to improve the hearing device performance when compensating for a hearing loss but also to allow a non-hearing impaired user to enjoy a high quality reproduction of the ambient sound in which a possible disturbance by noisy signal contributions would be minimized.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
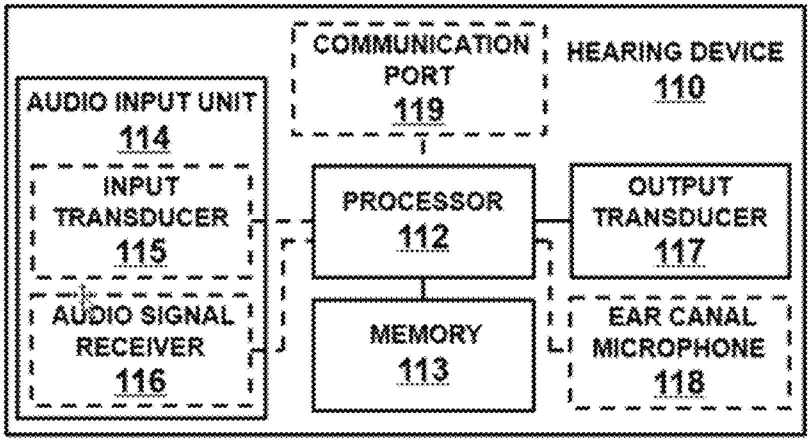
FIG. 1 schematically illustrates an exemplary hearing device.

The disclosure relates to method of operating a hearing device configured to be worn at an ear of a user. The disclosure further relates to a hearing device configured to perform the method.

It is a feature of the present disclosure to avoid at least one of the above mentioned disadvantages and to propose a method of operating a hearing device in which possible improvements regarding the noise attenuation in the input audio signal could be identified and/or applied. It is another feature to provide for an improved operation of the hearing device in which those possible improvements can be noticed by the user and/or a health care professional (HCP) and/or in which the hearing device noise attenuation performance can be modified according to those possible improvements. It is yet another feature to account for a dependency of those possible improvements on a current hearing situation. It is a further feature to provide a computer-implemented medium allowing a hearing device to operate in such a manner and/or a hearing device which is configured to operate in such a manner.

Accordingly, the present disclosure proposes a method of operating a hearing device configured to be at least partially inserted into an ear canal of a user, the method comprising

- receiving an input audio signal;
- amplifying the input audio signal; and
- outputting, by an output transducer included in the hearing device, an output audio signal based on the amplified audio signal so as to stimulate the user's hearing, wherein the method further comprises
- determining, during a time at which the output transducer abstains from outputting the output audio signal, a measure of a Real Ear Occluded Gain (REOG);
- determining, during a time at which the output transducer outputs the output audio signal, a measure of a Real Ear Aided Gain (REAG);
- determining, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and
- controlling an operation of the hearing device depending on the RERG measure.

It has been realized in the context of the present embodiments that such an RERG measure which can be determined based on the REOG measure and the REAG measure can be a meaningful indicator of the amount by which noise contained in the input audio signal can be attenuated in the amplified audio signal. Thus, obtaining the RERG measure in such a way can be exploited in various operations of the hearing device, e.g., when it comes to providing valuable information about a possible headroom for noise attenuation and/or adjusting a noise attenuation modifier of the hearing device in accordance with such information.

Independently, the present disclosure also proposes a non-transitory computer-readable medium storing instructions that, when executed by a processor, which may be included in a hearing device, cause a hearing device to perform operations of the method.

Independently, the present disclosure also proposes a hearing device configured to be at least partially inserted into an ear canal of a user, the hearing device comprising

- an input transducer configured to provide an input audio signal;
- a processor configured to amplify the input audio signal; and
- an output transducer configured to output an output audio signal based on the amplified audio signal so as to stimulate the user's hearing, wherein the processor is further configured to
- determine, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and control an operation of the hearing device depending on the RERG measure.

Independently, the present disclosure also proposes a hearing system comprising a first hearing device configured to be at least partially inserted into an ear canal of a first ear of a user and a second hearing device configured to be at least partially inserted into an ear canal of a second ear of the user, the first and second hearing device each comprising an input transducer configured to provide an input audio signal;

a processor configured to amplify the input audio signal; and an output transducer configured to output an output audio signal based on the amplified audio signal so as to stimulate the user's hearing, wherein the processor of the first and/or second hearing device is further configured to determine, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and control an operation of the hearing device depending on the RERG measure.

Independently, the present disclosure also proposes a fitting system configured to adapt a hearing device to the individual needs of a user, the fitting system comprising an input transducer configured to provide an input audio signal;

a processor configured to amplify the input audio signal; and an output transducer configured to output an output audio signal based on the amplified audio signal so as to stimulate the user's hearing, wherein the processor is further configured to determine, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and control an operation of the hearing device depending on the RERG measure.

Subsequently, additional features of some implementations of the method of operating a hearing device and/or the computer readable medium and/or the hearing device and/or the hearing system are described. Each of those features can be provided solely or in combination with at least another feature. The features can be correspondingly provided in some implementations of the method and/or the computer readable medium and/or the hearing device and/or the hearing system.

In some implementations, the input audio signal is indicative of a sound in the ambient environment of the user. In some implementations, the input audio signal is received from an input transducer, e.g., a microphone or a microphone array, included in the hearing device. In some implementations, the input audio signal is received by an audio signal receiver included in the hearing device, e.g., via radio frequency (RF) communication.

In some implementations, the method further comprises determining, during a time at which the output transducer abstains from outputting the output audio signal, the estimate of the REOG measure; and/or determining, based on a measured ear canal geometry of the user and/or based on a measured acoustic coupling of the hearing device with the environment, the estimate of the REOG measure; and/or receiving, from a memory and/or via a data link with an external data source, the estimate of the REOG measure; and/or determining, during a time at which the output transducer outputs the output audio signal, the estimate of the REAG measure; and/or determining, based on a measured ear canal geometry of the user and/or based on a measured acoustic coupling of the hearing device with the environment, the estimate of the REAG measure; and/or receiving, from a memory and/or via a data link with an external data source, the estimate of the REAG measure.

In some implementations, when the estimate of the REOG measure and/or the estimate of the REAG measure is determined based on a measured ear canal geometry of the user and/or based on a measured acoustic coupling of the hearing device with the environment, the estimate of the REOG measure and/or the estimate of the REAG measure may be based on at least one previously determined value of the REOG measure and/or at least one previously determined value of the REAG measure and/or based on a model configured to calculate the estimate of the REOG measure and/or the estimate of the REAG measure depending on the measured ear canal geometry of the user and/or the measured acoustic coupling of the hearing device with the environment.

In some instances, the model may be implemented as an acoustic model configured to calculate the estimate of REOG measure and/or the REAG measure and/or a machine learning (ML) algorithm configured to output the estimate of REOG measure and/or the REAG measure, which may be trained with previously measured ear canal geometries and/or previously measured acoustic couplings and corresponding estimates of the REOG measure and/or the REAG measure, and/or a look-up table including previously measured ear canal geometries and/or previously measured acoustic couplings and corresponding estimates of the REOG measure and/or the REAG measure. In some instances, the previously measured ear canal geometries and/or previously measured acoustic couplings and corresponding estimates of the REOG measure and/or the REAG measure may be collected from a plurality of different users. E.g., the previously measured ear canal geometries and/or previously measured acoustic couplings and corresponding estimates of the REOG measure and/or the REAG measure may be provided as a statistical distribution representative of a plurality of different users.

In some implementations, when the estimate of the REOG measure and/or the estimate of the REAG measure is received from a memory, the memory may be included in the hearing device and/or the memory may be included in a computing device, e.g., a portable device such as a smartphone, smartwatch, tablet, and/or the like and/or a desktop computer and/or a data server. In particular, the computing device may be implemented as a fitting system which can be employed to fit the hearing device to individual needs of the user, e.g., with regard to an individual hearing impairment and/or an individual ear canal geometry of the user. In some implementations, when the estimate of the REOG measure and/or the estimate of the REAG measure is received via a data link with an external data source, the external data source may be an external computing device, e.g., a portable device such as a smartphone, smartwatch, tablet, and/or the like and/or a desktop computer and/or a data server.

In some implementations, when the estimate of the REOG measure and/or the estimate of the REAG measure is received from a memory and/or via a data link with an external data source, the estimate of the REOG measure and/or the estimate of the REAG measure may be based on at least one previously determined value of the REOG measure and/or at least one previously determined value of the REAG measure. E.g., the estimate of the REOG measure and/or the estimate of the REAG measure may then be based on at least one previously determined value of the REOG measure and/or at least one previously determined value of the REAG measure and/or based on a model configured to calculate the estimate of the REOG measure and/or the estimate of the REAG measure depending on the measured ear canal geometry of the user and/or the measured acoustic coupling of the hearing device with the environment.

In some implementations, the estimate of the REOG measure and/or the REAG measure is determined based on an ear-to-coupler level difference (ECLD) of an acoustic coupler inserted into an ear canal of the user, e.g., during a fitting of the hearing device.

In some implementations, the hearing device comprises an ear-canal microphone configured to provide an in-the-ear audio signal indicative of a sound detected inside the ear canal, wherein the estimate of the REOG measure and/or the REAG measure is determined based on the in-the-ear audio signal. E.g., the estimate of the REOG measure may then be determined during a time at which the output transducer abstains from outputting the output audio signal, and/or the estimate of the REOG measure may then be determined during a time at which the output transducer outputs the output audio signal. In some implementations, the hearing device comprises a sealing configured to reduce sound from the environment entering the ear canal, wherein the ear-canal microphone is positioned between the sealing and the tympanic membrane of the ear when the hearing device is at least partially inserted into the ear canal.

In some implementations, the hearing device comprises an ear-canal probe, e.g., a sound tube, configured to provide an in-the-ear audio signal indicative of a sound detected inside the ear canal, wherein the estimate of the REOG measure and/or the REAG measure is determined based on the in-the-ear audio signal. E.g., the estimate of the REOG measure may then be determined during a time at which the output transducer abstains from outputting the output audio signal, and/or the estimate of the REOG measure may then be determined during a time at which the output transducer outputs the output audio signal. In some implementations, the hearing device comprises a sealing configured to reduce sound from the environment entering the ear canal, wherein an opening of the ear-canal probe is positioned between the sealing and the tympanic membrane of the ear when the hearing device is at least partially inserted into the ear canal.

In some implementations, the estimate of the REOG measure and/or the REAG measure may be determined as described in paragraphs [0021]-[0023] disclosed in Swiss patent application publication No. CH 707 585 A2, which is herewith included by reference.

In some implementations, the RERG measure is indicative of a difference between the REOG measure and the REAG measure. In some implementations, the RERG measure comprises a pair of values indicative of the REOG measure and the REAG measure.

In some implementations, the method further comprises comparing the RERG measure to a threshold of the RERG measure, wherein the operation is controlled depending on whether the RERG measure falls below or exceeds the threshold.

In some implementations, the method further comprises outputting a notification to the user. E.g., the notification may be outputted when the RERG measure is determined to fall below the threshold. In some implementations, the method further comprises outputting data indicative of the RERG measure to a computing device. E.g., before outputting the data indicative of the RERG measure, the RERG measure may be repeatably, e.g., continuously, determined over time, and logged as the data indicative of the RERG measure. In some implementations, the method further comprises outputting a control signal to a computing device, the control signal instructing the computing device to output a notification. E.g., the controls signal may be outputted when the RERG measure is determined to fall below the threshold. In some implementations, the method further comprises logging data indicative of the RERG measure over time.

In some implementations, the method further comprises adjusting of a noise attenuator configured to attenuate noise in the input audio signal. E.g., the noise attenuator may be adjusted to provide for an increased noise attenuation when the RERG measure is determined to exceed the threshold. E.g., the noise attenuator may be deactivated when the RERG measure is determined to fall below the threshold. In some implementations, the adjusting of the noise attenuator comprises at least one of adjusting a noise cancelling algorithm; adjusting a beamformer; adjusting an active noise cancelling (ANC); and adjusting an acoustic coupling of the hearing device with the environment.

In some implementations, the method further comprises determining, from the input audio signal, an occurrence of a current acoustic scene. E.g., the input audio signal may be attributed to a class from a plurality of predetermined classed each representative of a different acoustic scene. In some implementations, the method further comprises associating the RERG measure with the current acoustic scene. E.g., when logging the RERG measure, the RERG measure may be logged in conjunction with the associated acoustic scene. In some implementations, the operation is controlled depending on the current acoustic scene. E.g., when the operation controlled depending on the RERG measure comprises adjusting of a noise attenuator, the noise attenuator may be adjusted also depending on the acoustic scene. For instance, the noise attenuator may be activated and/or adjusted to provide for an increased noise attenuation in a case in which the current acoustic scene is representative for a noisy sound environment and/or a rather low signal to noise ratio (SNR).

In some implementations, the RERG measure is determined for a plurality of frequency values.

In some implementations, the REOG measure may be defined as a measure indicative of a property, e.g., an amplitude and/or an SPL and/or a transfer function, of sound inside the ear canal in a situation in which the hearing device is inserted into the ear canal but abstains from outputting an output audio signal into the ear canal. In some implementations, the REAG measure may be defined as a measure indicative of a property, e.g., an amplitude and/or an SPL and/or a transfer function, of sound inside the ear canal in a situation in which the hearing device is inserted into the ear canal and outputs the output audio signal based on the amplified input audio signal into the ear canal.

In some implementations, the method is executed by a fitting system configured to adapt the hearing device to individual needs of a user, e.g., with regard to an individual fitting of the hearing device to the user's ear canal geometry and/or to an individual hearing loss of the user. the method is executed by the hearing device. In some implementations, the method is executed by the fitting system and/or the hearing device, e.g., by a processor included in the fitting system and/or a processor included in the hearing device.

FIG. 1 illustrates an exemplary hearing device 110 configured to be worn at an ear of a user. Hearing device 110 may be implemented by any type of hearing device configured to enable or enhance hearing or a listening experience of a user wearing hearing device 110. For example, hearing device 110 may be implemented by a hearing aid configured to provide an amplified version of audio content to a user, a sound processor included in a bimodal hearing system configured to provide both amplification and electrical stimulation representative of audio content to a user, or any other suitable hearing prosthesis, or an earbud or an earphone or a hearable.

Different types of hearing device 110 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, hearables, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position.

As shown, hearing device 110 includes a processor 112 communicatively coupled to a memory 113, an audio input unit 114, and an output transducer 117. Audio input unit 114 may comprise at least one input transducer 115 and/or an audio signal receiver 116 configured to provide an input audio signal. Hearing device 110 may further include a communication port 119. Hearing device 110 may further include a sensor unit 118 communicatively coupled to processor 112. Hearing device 110 may include additional or alternative components as may serve a particular implementation. Input transducer 115 may be implemented by any suitable device configured to detect sound in the environment of the user and to provide an input audio signal indicative of the detected sound, e.g., a microphone or a microphone array. Output transducer 117 may be implemented by any suitable audio transducer configured to output an output audio signal to the user, for instance a receiver of a hearing aid or a loudspeaker of an earbud.

Processor 112 is configured to receive, from input transducer 115 and/or audio signal receiver 116, an input audio signal which may be, e.g., indicative of a sound detected in the environment of the user at the location of the user and/or remote from the user by a remote microphone; to amplify the input audio signal, e.g., by executing at least one audio processing algorithm to generate a processed audio signal, wherein the amplified audio signal can be provided to output transducer 117 so as to generate an output audio signal based on the processed audio signal so as to stimulate the user's hearing. Processor 112 is further configured to determine, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and to control an operation of the hearing device depending on the RERG measure. These and other operations, which may be performed by processor 112, are described in more detail in the description that follows.

Processor 112 may be implemented as a single processing device or may be implemented as a processing unit of a processor comprising multiple processing units, which may cooperate as a distributed processing system and/or in a master-slave configuration, as further described below. E.g., processor 112 may be a first processing unit, and a second processing unit may be implemented in a second hearing device and/or a portable device communicatively coupled to first processing unit 112. The above and below described operations may then be performed by the processor comprising the multiple processing units.

Memory 113 may be implemented by any suitable type of storage medium and is configured to maintain, e.g. store, data controlled by processor 112, in particular data generated, accessed, modified and/or otherwise used by processor 112. For example, memory 113 may be configured to store instructions used by processor 112 to amplify and/or further process the input audio signal received from input transducer 115, e.g., audio processing instructions in the form of one or more audio processing algorithms. The audio processing algorithms may comprise different audio processing instructions of processing the input audio signal received from input transducer 115. For instance, the audio processing algorithms may provide for at least one of a gain model (GM) defining an amplification characteristic, a noise cancelling (NC) algorithm, a wind noise cancelling (WNC) algorithm, a reverberation cancelling (RevC) algorithm, a feedback cancelling (FC) algorithm, a speech enhancement (SE) algorithm, a gain compression (GC) algorithm, a noise cleaning algorithm, a binaural synchronization (BS) algorithm, a beamforming (BF) algorithm, in particular static and/or adaptive beamforming, and/or the like. A plurality of the audio processing algorithms may be executed by processor 112 in a sequence and/or in parallel to generate a processed audio signal. As another example, memory 113 may be configured to store one or more estimates of an REOG measure and/or an REAG measure which may be employed by processor 112 to determine a RERG measure.

Memory 113 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113. Memory 113 may further comprise a volatile memory, for instance a static or dynamic random access memory (RAM).

As illustrated, hearing device 110 may further include an in-the-ear input transducer 118, e.g., an ear canal microphone, configured to detect sound inside the ear canal and to provide an in-the-ear audio signal indicative of the detected sound. For instance, hearing device 110 may comprise a sealing configured to reduce sound from the environment entering the ear canal, wherein ear-canal microphone 118 may be positioned between the sealing and the tympanic membrane of the ear when hearing device 110 is at least partially inserted into the ear canal.

As illustrated, hearing device 110 may further comprise an audio signal receiver 116. Audio signal receiver 116 may be implemented by any suitable data receiver and/or data transducer configured to receive an input audio signal from a remote audio source. For instance, the remote audio source may be a wireless microphone, such as a table microphone, a clip-on microphone and/or the like, and/or a portable device, such as a smartphone, smartwatch, tablet and/or the like, and/or any another data transceiver configured to transmit the input audio signal to audio signal receiver 116. E.g., the remote audio source may be a streaming source configured for streaming the input audio signal to audio signal receiver 116. As another example, the remote audio source may be a remote microphone, e.g., a table microphone or a clip-on microphone, configured to detect sound at a remote location and transmit the input audio signal indicative of the detected sound to audio signal receiver 116. Audio signal receiver 116 may be configured for wired and/or wireless data reception of the input audio signal. For instance, the input audio signal may be received in accordance with a Bluetooth™ protocol and/or by any other type of radio frequency (RF) communication.

As illustrated, hearing device 110 may further comprise a communication port 119. Communication port 119 may be implemented by any suitable data transmitter and/or data receiver and/or data transducer configured to exchange data with another device. For instance, the other device may be another hearing device configured to be worn at the other ear of the user than hearing device 110 and/or a communication device such as a smartphone, smartwatch, tablet and/or the like. Communication port 119 may be configured for wired and/or wireless data communication. For instance, data may be communicated in accordance with a Bluetooth™ protocol and/or by any other type of radio frequency (RF) communication.

Figure 2:
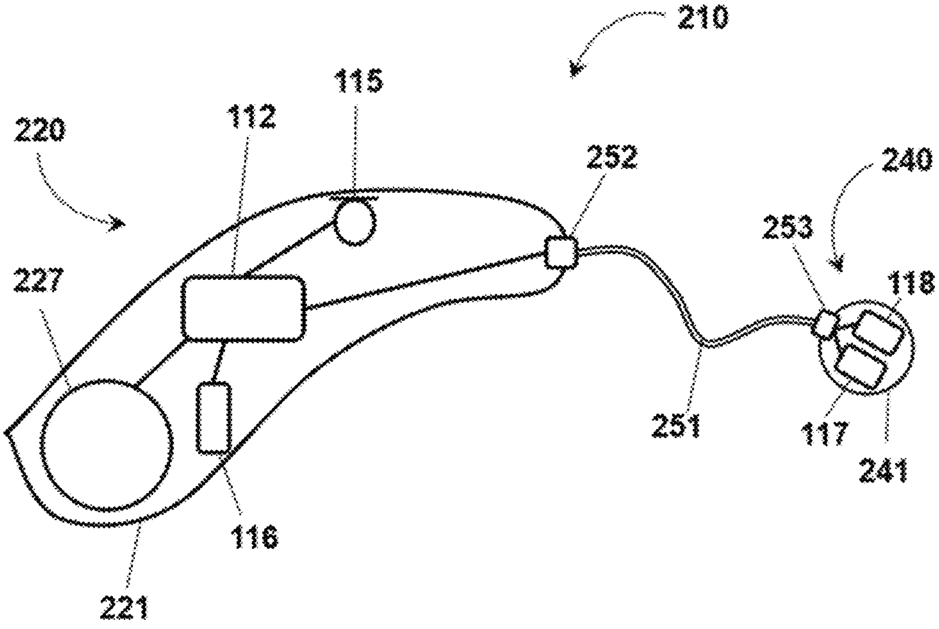
FIG. 2 schematically illustrates an embodiment of the hearing device illustrated in FIG. 1 as a RIC hearing aid.

FIG. 2 illustrates an exemplary implementation of hearing device 110 as a RIC hearing aid 210. RIC hearing aid 210 comprises a BTE part 220 configured to be worn at an ear at a wearing position behind the ear, and an ITE part 240 configured to be worn at the ear at a wearing position at least partially inside an ear canal of the ear. BTE part 220 comprises a BTE housing 221 configured to be worn behind the ear. BTE housing 221 accommodates processor 112 communicatively coupled to input transducer 115 and audio signal receiver 116. BTE part 220 further includes a battery 227 as a power source. ITE part 240 is an earpiece comprising an ITE housing 241 at least partially insertable in the ear canal. ITE housing 241 accommodates output transducer 117. ITE part 240 further includes ear-canal microphone 118 configured to detect sound inside the ear canal and to provide an in-the-ear audio signal indicative of the detected sound. BTE part 220 and ITE part 240 are interconnected by a cable 251. Processor 112 is communicatively coupled to output transducer 117 and to ear-canal microphone 118 of ITE part 240 via cable 251 and cable connectors 252, 253 provided at BTE housing 221 and ITE housing 241.

Figure 3:
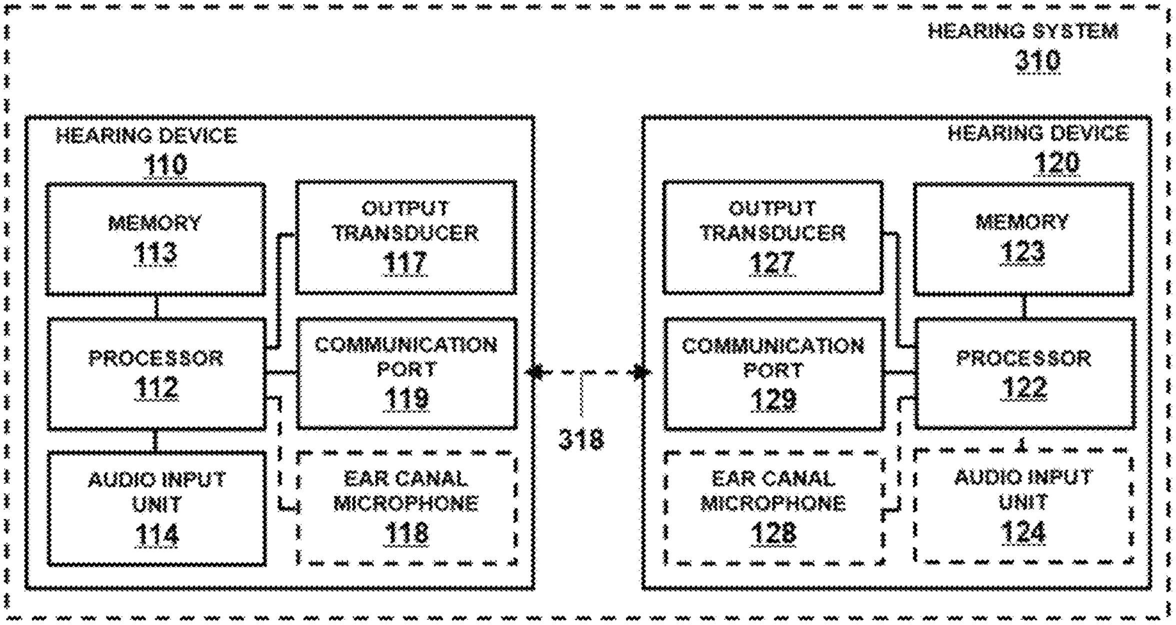
FIG. 3 schematically illustrates an exemplary hearing system comprising a first and second hearing device configured to be worn at different ears of the user.

FIG. 3 illustrates an exemplary hearing system 310 comprising first hearing device 110 configured to be worn at a first ear of the user, and a second hearing device 120 configured to be worn at a second ear of the user. Hearing system 310 may also be denoted as a binaural hearing device. Second hearing device 120 may be implemented corresponding to first hearing device 110. E.g., first hearing device 110 and second hearing device 120 may each be implemented corresponding to RIC hearing aid 210 described above. As shown, second hearing device 120 includes a processor 122 communicatively coupled to a memory 123, an output transducer 127, an audio input unit 124, which may comprise at least one input transducer corresponding to input transducer 115 and/or at least one audio signal receiver corresponding to audio signal receiver 116. Second hearing device 120 may further include an ear canal microphone 128 configured to detect sound inside the ear canal and to provide an in-the-ear audio signal indicative of the detected sound. Second hearing device 120 further includes a communication port 129.

Processor 112 of first hearing device 110 and processor 122 of second hearing device 120 can be communicatively coupled by communication ports 119, 129 via a communication link 318. In this way, processor 112 of first hearing device 110 may form a first processing unit and processor 122 of second hearing device may form a second processing unit of a processor comprising the first processing unit 112 and the second processing unit 122. For instance, processor 112, 122 may then be implemented as a distributed processing system of first processing unit 112 and second processing unit 122 and/or may operate in a master-slave configuration of first processing unit 112 and second processing unit 122. Hearing system 310 may further comprise a portable device, e.g., a communication device such as a smartphone, smartwatch, tablet and/or the like. The portable device, in particular a processor included in the portable device, may also be communicatively coupled to processors 112, 122, e.g., via communication ports 119, 129.

Figure 4:
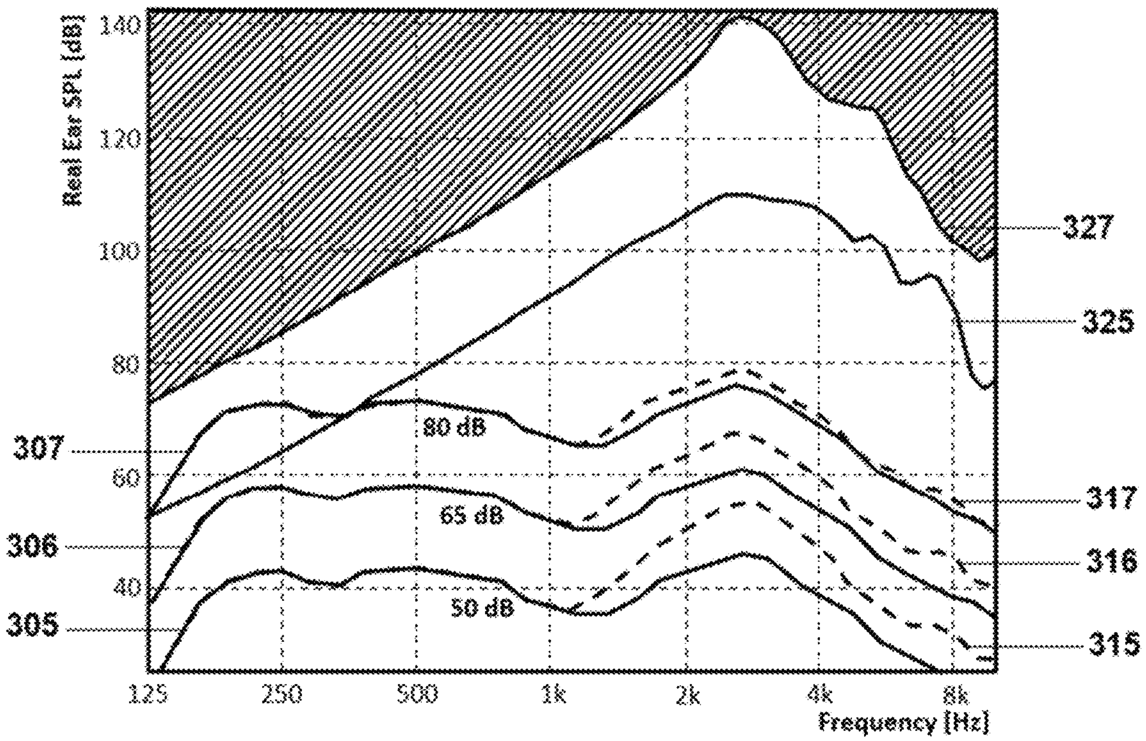
FIG. 4 schematically illustrates exemplary functional plots of a REOG measure and a REAG measure depending on frequency.

FIG. 4 illustrates functional plots of a measured real ear occluded response (REOR) 305, 306, 307 and a measured real ear aided response (REAR) 315, 316, 317. The frequency is indicated on an axis of abscissas 202. A sound pressure level (SPL) measurable close to the tympanic membrane, which may also be denoted as a real ear sound pressure level (SPL RE), is indicated on an axis of ordinates 203. Plots 305, 315 illustrate the measured REOR and REAR for a SPL in the free field (SPL FF) at 50 decibels (dB). Plots 306, 316 illustrate the measured REOR and REAR for a SPL FF at 65 dB. Plots 307, 317 illustrate the measured REOR and REAR for a SPL FF at 80 dB. In the illustrated example, the REOR and REAR have been measured for a sound comprising speech in the ambient environment. Moreover, the plots have been measured when a hearing aid with a dome-shaped sealing had been inserted in an ear canal of the user. An acoustic coupling between the ambient environment and the inner region of the ear canal provided by the dome-shaped sealing has been rather open allowing ambient sound to directly enter the ear canal to a larger extent through the sealing, e.g., as compared to a rather occluded or sealed acoustic coupling which would block the ambient sound to a larger extent from entering the ear canal. An amplification of the input audio signal, e.g., via a gain model, has been provided during measuring the REAR, wherein the amplification has been fitted to the needs of a user having a mild hearing loss.

To illustrate, the SPL RE may be determined based on the in-the-ear audio signal detected by ear-canal microphone 118, 128. In other examples, the SPL RE may also be determined based on an in-the-ear audio signal detected by a probe inserted into the ear canal. The REOR may then be determined during a time at which output transducer 117, 127 abstains from outputting the output audio signal. The REAG may be determined during a time at which output transducer 117, 127 outputs the output audio signal. In some instances, the REOR may be provided as a measure of the Real Ear Occluded Gain (REOG), and the REAR may be provided as a measure of the Real Ear Aided Gain (REAG). In this regard, the REOR may be regarded as a measure of the REOG, and the REAR may be regarded as a measure of the REAG. In some instances, the REOG measure may also be determined as a transfer function between the SPL FF and the SPL RE determined during a time at which output transducer 117, 127 abstains from outputting the output audio signal. The REAG measure may be determined as a transfer function between the SPL FF and the SPL RE determined during a time at which output transducer 117, 127 outputs the output audio signal. For instance, the SPL FF may be determined based on the input audio signal detected by input transducer 115, 117 which is indicative of the sound in the ambient environment.

Thus, the REOG measure may be defined as a measure indicative of a property, such as an amplitude and/or an SPL and/or a transfer function, of sound, e.g., ambient sound entering the ear canal, inside side the ear canal in a situation in which the hearing device is inserted into the ear canal but abstains from outputting an output audio signal into the ear canal. The REAG measure may be defined as a measure indicative of a property, such as an amplitude and/or an SPL and/or a transfer function, of sound, e.g., ambient sound entering the ear canal and ambient sound detected by at least one input transducer as an input audio signal before being amplified and/or an input audio signal transmitted to the hearing device from a remote audio source before being amplified, inside the ear canal in a situation in which the hearing device is inserted into the ear canal and outputs the output audio signal based on the amplified input audio signal into the ear canal. In some instances, the REOG measure and/or REAG measure may be related to a corresponding property of sound outside side the ear canal, e.g., as a transfer function between the SPL FF and the SPL RE and/or a pair of values indicative of the SPL FF and the SPL RE. Moreover, since the REOG measure and/or the REAG measure may depend on a frequency of the sound, the REOG measure and/or the REAG measure may be determined for a plurality of frequency values, e.g., within a frequency spectrum in which alleviating a hearing impairment of the user would require an amplification of the ambient sound.

As illustrated, the RE SPL of the REAR measure 315, 316, 317 exceeds the RE SPL of the REOR measure 305, 306, 307 only at frequencies above 1 kHz. In particular for the SPL FF at 80 dB, which is representative for a rather loud hearing situation, the REAR measure 317 only slightly differs from the REOR measure 307. As mentioned before, the REOR may also be regarded as a measure of the REOG, and the REAR may be regarded as a measure of the REAG. Based on the REOG measure 305, 306, 307 and the REAG measure 315, 316, 317, a measure indicative of an amount by which noise contained in the input audio signal can be attenuated in the amplified audio signal may be determined. Such a measure may be denoted as a Real Ear Reducible Gain (RERG). For instance, the RERG measure may be determined as a difference between the REAG measure 315, 316, 317 and the REOG measure 305, 306, 307. In the illustrated example, the RERG measure is rather small thus representing only a small headroom for which noise attenuators can be employed in a more effective way. Since the REOG measure and the REAG measure may depend on a frequency of the sound, the RERG measure may also be determined for a plurality of frequency values, e.g., within the frequency spectrum in which alleviating a hearing impairment of the user would require an amplification of the ambient sound.

Furthermore, FIG. 4 illustrates a functional plot 327 of an exemplary sound pressure level of the output audio signal which may be maximally possible to be outputted by output transducer 117, 127. E.g., the maximum possible sound pressure level 327 of the output audio signal can depend on various electroacoustic properties of hearing device 110, 120, 210, as well as the acoustic coupling between the ambient environment and the inner ear canal region provided by the hearing device 110, 120, 210. Another functional plot 325 illustrated in FIG. 4 represents an exemplary individual maximum power output (MPO) of hearing device 110, 120, 210 which has been adjusted to conform to the individual needs of the user, e.g., during a fitting procedure. In this regard, the individual maximum possible sound pressure level 325 is limited by the maximum possible sound pressure level 327 of the output audio signal.

Figure 5:
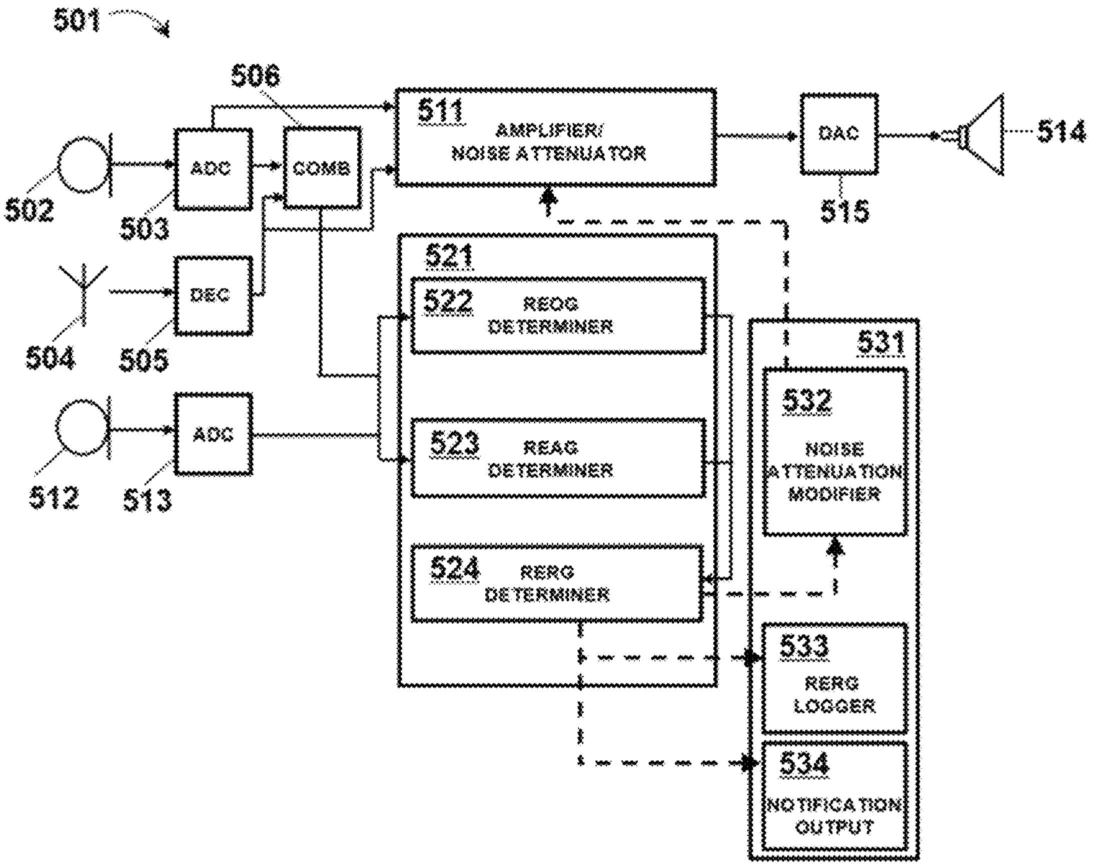
FIG. 5 schematically illustrates an exemplary arrangement for operating a hearing device.

FIG. 5 illustrates a functional block diagram of an exemplary audio signal processing arrangement 501 that may be implemented by hearing device 110, 210 and/or a fitting system configured to adapt hearing device 110, 210 to the individual needs of a user. Arrangement 501 comprises at least one input transducer 502, which may be implemented by input transducer 115, 125, and/or at least one audio signal receiver 504, which may be implemented by audio signal receiver 116. E.g., input transducer 502 may be implemented as a microphone or microphone array configured to detect sound in the ambient environment of the user. Audio signal receiver 504 may be configured to receive the input audio signal from a remote streaming source, e.g., from a table microphone or a clip-on microphone or a streaming server. The input audio signal provided by input transducer 115, 125, 502 may be an analog signal. The analog signal may be converted into a digital signal by an analog-to-digital converter (ADC) 503. The input audio signal provided by audio signal receiver 504 may be an encoded signal. The encoded signal may be decoded into a decoded signal by a decoder (DEC) 505. Arrangement 501 further comprises at least one output transducer 514, which may be implemented by output transducer 117, 127. Arrangement 501 may further comprise at least one in-the-ear input transducer 512, which may be implemented as ear canal microphone 118, configured to provide an in-the-ear audio signal indicative of sound detected inside the ear canal. The in-the-ear audio signal may be an analog signal, which may be converted into a digital signal by an analog-to-digital converter (ADC) 513.

Arrangement 501 further comprises an audio processing module 511, an audio signal analyzing module 521, and an operation control module 531. Modules 511, 521, 531 may be executed, e.g., by processor 112 of first hearing device 110 and/or by processor 122 of second hearing device 120 and/or by a processor including processor 112 of first hearing device 110 as a first processing unit and/or processor 122 of second hearing device 120 as a second processing unit. As illustrated, the input audio signal provided by input transducer 115, 125, 502, after it has been converted into a digital signal by analog-to-digital converter 503, and/or the input audio signal provided by audio signal receiver 504, after it has been decoded by decoder 505, can be received by audio processing module 511. Audio processing module 511 is configured to amplify the input audio signal and/or to further process the input audio signal by at least one audio processing algorithm to generate an amplified audio signal. Besides the amplifying of the input audio signal, e.g., in accordance with a gain model, the processing of the input audio signal may comprise applying of a noise attenuation algorithm on the input audio signal. The noise attenuation algorithm may comprise, e.g., a noise cancelling algorithm and/or a beamformer and/or an active noise cancelling (ANC) and/or the like. Based on the amplified audio signal, an output audio signal can be output by output transducer 514 so as to stimulate the user's hearing. To this end, the processed audio signal may be converted into an analog signal by a digital-to-analog converter (DAC) 515 before providing the processed audio signal to output transducer 514.

The input audio signal provided by input transducer 115, 125, 502 after it has been converted into a digital signal by analog-to-digital converter 503, and/or the input audio signal provided by audio signal receiver 504, after it has been decoded by decoder 505, can also be received by audio signal analyzing module 521. As illustrated, when a first input audio signal is provided by input transducer 115, 125, 502 and a second input audio signal is provided by audio signal receiver 504, the first and second input audio signal may be combined to a combined input audio signal by a combiner (COMB) 506. Thus, the input audio signal provided by input transducer 115, 125, 502 and/or the input audio signal provided by audio signal receiver 504 or the combined input audio signal may be received by audio signal analyzing module 521. Further, the in-the-ear audio signal provided by in-the-ear input transducer 512, after it has been converted into a digital signal by analog-to-digital converter (ADC) 513, can be received by audio signal analyzing module 521.

As illustrated, audio signal analyzing module 521 comprises a REOG measure determination module 522, a REAG measure determination module 523, and an operation control module 524. In some implementations, as illustrated, REOG measure determination module 522 is configured to determine, during a time at which output transducer 514 abstains from outputting the output audio signal, an estimate of a measure of the REOG. This may imply determining the REOR during the time at which output transducer 514 abstains from outputting the output audio signal, which, as further described above, may then be regarded as a measure of the REOG. In some instances, the REOG measure may be determined based on the in-the-ear audio signal detected by ear-canal microphone 512 and/or based on an in-the-ear audio signal detected by a probe inserted into the ear canal. In some instances, determining the REOG measure may also imply determining a transfer function between the SPL FF and the SPL RE during a time at which output transducer 514 abstains from outputting the output audio signal. For instance, the REOG measure may then be determined based on the SPL FF which may be determined based on the input audio signal detected by input transducer 502 which is indicative of the sound in the ambient environment and the in-the-ear audio signal detected by ear-canal microphone 512 and/or an in-the-ear audio signal detected by a probe inserted into the ear canal.

In some implementations, REOG measure determination module 522 is configured to determine the estimate of a measure of the REOG based on a measured ear canal geometry of the user and/or based on a measured acoustic coupling of the hearing device with the environment. E.g., the estimate of the REOG measure may then be based on at least one previously determined value of the REOG measure and/or based on a model configured to calculate the estimate of the REOG measure, e.g., depending on the measured ear canal geometry of the user and/or the measured acoustic coupling of the hearing device with the environment.

In some implementations, REOG measure determination module 522 is configured to receive the estimate of a measure of the REOG from a memory and/or via a data link with an external data source. E.g., the memory may be included in hearing device 110, 210 and/or in a fitting system.

In some implementations, as illustrated, REAG measure determination module 523 is configured to determine, during a time at which output transducer 514 outputs the output audio signal, a measure of the REAG. This may imply determining the REAR during the time at which output transducer 514 abstains from outputting the output audio signal, which, as further described above, may then be regarded as a measure of the REAG. In some instances, the REAG measure may be determined based on the in-the-ear audio signal detected by ear-canal microphone 512 and/or based on an in-the-ear audio signal detected by a probe inserted into the ear canal. In some instances, determining the REAG measure may also imply determining a transfer function between the SPL FF and the SPL RE during a time at which output transducer 514 output transducer 514 outputs the output audio signal. For instance, the REAG measure may then be determined based on the SPL FF which may be determined based on the input audio signal detected by input transducer 502 which is indicative of the sound in the ambient environment and the in-the-ear audio signal detected by ear-canal microphone 512 and/or an in-the-ear audio signal detected by a probe inserted into the ear canal.

In some implementations, REAG measure determination module 523 is configured to determine the estimate of a measure of the REAG based on a measured ear canal geometry of the user and/or based on a measured acoustic coupling of the hearing device with the environment. E.g., the estimate of the REAG measure may then be based on at least one previously determined value of the REAG measure and/or based on a model configured to calculate the estimate of the REAG measure, e.g., depending on the measured ear canal geometry of the user and/or the measured acoustic coupling of the hearing device with the environment.

In some implementations, REAG measure determination module 523 is configured to receive the estimate of a measure of the REAG from a memory and/or via a data link with an external data source. E.g., the memory may be included in hearing device 110, 210 and/or in a fitting system.

RERG measure determination module 523 is configured to determine, based on the estimate of the REOG measure and the REAG measure, a measure of the RERG indicative of an amount by which noise contained in the input audio signal can be attenuated in the amplified audio signal. In some instances, the RERG measure is determined such that the RERG measure is indicative of a difference between the REOG measure and the REAG measure. In some instances, the RERG measure is determined such that the RERG measure comprises a pair of values indicative of the REOG measure and the REOG measure. In some instances, when the REOG measure and/or the REAG measure are determined for a plurality of frequency values, the RERG measure may also be determined for at least two of the plurality of frequency values.

Operation control module 524 is configured to control, depending on the RERG measure, an operation of hearing device 110, 120, 210. To this end, operation control module 524 may comprise a noise attenuation modification module 532 and/or a RERG measure logging module 533 and/or a notification output module 534. Noise attenuation modifier 532 is configured to adjust at least one noise attenuator configured to attenuate noise contained in the input audio signal, in particular such that noise contained in the output audio signal, which is outputted based on the amplified audio signal, is reduced as compared to the noise contained in the input audio signal and/or reduced as compared to the noise which is currently contained in the output audio signal. In some instances, the noise attenuator may be executed by audio processing module 511. Correspondingly, audio processing module 511 may be controlled by noise attenuation modifier 532 to modify the noise attenuation. E.g., the noise attenuator may comprise e a noise cancelling algorithm and/or a beamformer and/or an active noise cancelling (ANC).

Accordingly, the adjusting of the noise attenuator may comprise at least one of adjusting, e.g., activating and/or changing, a noise cancelling algorithm depending on the RERG measure; adjusting, e.g., activating and/or changing and/or steering, a beamformer depending on the RERG measure; and adjusting an active noise cancelling (ANC) depending on the RERG measure. E.g., the noise cancelling algorithm may be configured to provide for a reduction and/or suppression and/or cancelling of noise contained in the input audio signal. E.g., steering of the beamformer may comprises altering a directivity and/or beam width of the beamformer. E.g., the ANC may be configured to provide for a reduction and/or cancelling of noise contained in the sound in the ear canal by employing a destructive interference between sound waves directly entering the ear canal and sound waves generated by the output audio signal. In particular, noise attenuation modifier 532 may thus be configured to adjust the noise attenuator such that the noise attenuator may be only activated at a time and/or hearing situation in which the noise attenuator would import a benefit for the user, as indicated by the RERG measure. For instance, a rather complex and/or expensive audio processing required by the noise attenuator may thus be reserved only for such beneficial times and/or hearing situations.

Noise attenuation modifier 532 may also be configured to adjust an acoustic coupling of the hearing device with the environment depending on the RERG measure. To this end, hearing device 110, 120, 210 may be equipped with an adjustable acoustic coupling. For instance, hearing device 110, 120, 210 may comprise an active vent configured to modify an amount of ambient sound directly entering the ear canal from the ambient environment. E.g., an amount of ambient sound directly entering the ear canal may be controlled to be reduced in order to reduce noise contained in the sound inside the ear canal.

RERG measure logging module 533 is configured to log, e.g., store, the RERG measure. In some instances, the RERG measure may be continuously monitored and logged by RERG measure logging module 533 depending on the RERG measure. In some instances, the logged RERG may be provided with a time stamp indicative of a current time at which the RERG has been determined. In some instances, the RERG measure may be logged with a corresponding frequency for which the RERG measure has been determined and/or a plurality of frequencies for which the RERG measure has been determined. In some instances, the RERG may be logged with a corresponding value of the SPL FF at which the RERG has been determined. In some instances, the input audio signal may be classified by attributing at least one class from a plurality of predetermined classes to the input audio signal. E.g., audio processing module 511 may comprise a classifier configured to classify the input audio signal. E.g., different audio processing instructions performed by audio processing module 511 can be associated with different classes. The RERG may then be logged in conjunction with a corresponding class of the input audio signal for which the RERG has been determined.

The RERG measure logged over time may be outputted at a later time, e.g., to the user and/or a health care professional (HCP). E.g., the logged data of the RERG measure may be transferred to a computing device in order to be analyzed by the user and/or HCP. E.g., based on the logged RERG measure, the user and/or HCP may come to the conclusion that a different configuration of hearing device 110, 120, 210 would be more suitable to provide for a desired degree of noise attenuation for the user, in particular with regard to an individual hearing loss of the user. To illustrate, when hearing device 110, 120, 210 would be configured to provide for a rather open acoustic coupling when inserted into the ear canal and the logged RERG measure would indicate that noise cannot sufficiently attenuated in this configuration, e.g., in specific noisy situations corresponding to a certain class attributed to the input audio signal, the user and/or HCP may decide to provide hearing device 110, 120, 210 with a more occluded acoustic coupling in order to increase the noise attenuation.

Notification output module 534 is configured to output a notification to the user. E.g., the notification may be outputted in the form of an audio signal, such as a tone or speech. The notification may also be outputted via a communication device, e.g., a smartphone, communicatively coupled to hearing device 110, 120, 210, e.g., in the form of an audio signal and/or a vibration and/or an output visible on a screen of the communication device. In some instances, the notification may imply a warning to the user that noise cannot sufficiently attenuated, e.g., in a present moment and/or in a current hearing situation. In some instances, the notification may also comprise information about a frequency at which the noise cannot be sufficiently attenuated.

To illustrate, when hearing device 110, 120, 210 would be configured to provide for a rather open acoustic coupling when inserted into the ear canal and the user would receive such a warning rather often when using hearing device 110, 120, 210, the user and/or an HCP of the user may decide to provide hearing device 110, 120, 210 with a more occluded acoustic coupling in order to increase the noise attenuation. In some instances, notification output module 534 may be configured to output a control signal to a computing device, the control signal instructing the computing device to output the notification. To illustrate, when an HCP adapts and/or fits hearing device 110, 120, 210 to the individual needs of the user, the notification may be useful for the HCP to decide whether a more open or a more occluded acoustic coupling of hearing device 110, 120, 210 shall be provided.

In some instances, e.g., when the RERG measure is determined such that the RERG measure is indicative of a difference between the REOG measure and the REAG measure, the operation may be controlled depending on whether the RERG measure falls below or exceeds a threshold. In some instances, the threshold may depend on frequency. E.g., when the RERG measure is determined for a plurality of frequencies, the threshold may vary for different frequencies. In some instances, e.g., when the RERG measure is determined such that the RERG measure comprises a pair of values indicative of the REOG measure and the REOG measure, the threshold may comprise a first threshold and a second threshold, wherein the operation may be controlled depending on whether the first value of the pair falls below or exceeds the first threshold and the second value of the pair falls below or exceeds the second threshold. In some instances, the second threshold may be selected to depend on the first threshold. E.g., when the first threshold has a larger value, the second threshold may be selected to have a smaller value, and/or vice versa.

To illustrate, after comparing the RERG measure to a threshold of the RERG measure and when the comparison yields that the RERG measure falls below the threshold, a notification may be outputted that a noise suppression is not sufficiently possible now. As another example, after comparing the RERG measure to the threshold of the RERG measure and when the comparison yields that the RERG measure exceeds the threshold, at least one noise attenuator may be adjusted to provide for an attenuation and/or an increased attenuation of noise contained in the input audio signal and/or noise contained in the sound entering the ear canal. As another example, after comparing the RERG measure to the threshold of the RERG measure, the logging of the RERG measure may comprise logging of information whether the RERG measure falls below or exceeds the threshold.

Figure 6:
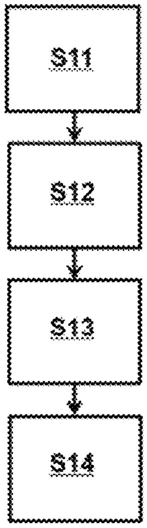
FIGS. 6-8 schematically illustrate some exemplary methods of operating a hearing device and/or a hearing system according to principles described herein.

FIG. 6 illustrates a block flow diagram for an exemplary method of operating a hearing device configured to be worn at an ear of a user. The method may be executed by processor 112 of hearing device 110 and/or processor 122 of hearing device 120 and/or another processor communicatively coupled to processor 112, 122 and/or a processor included in a fitting system. At operation S11, an estimate of a measure of the REOG is provided. E.g., the estimate of the REOG measure may be determined during a time at which output transducer 117, 127 abstains from outputting the output audio signal and/or based on a measured ear canal geometry of the user and/or based on a measured acoustic coupling of the hearing device with the environment, and/or the estimate of the REOG measure may be received, from a memory and/or via a data link with an external data source. E.g., output transducer 117, 127 may be switched off during determining the REOG measure and/or the REOG measure may be received via communication port 119, 129.

At operation S12, an estimate of a measure of the REAG is provided during a time at which output transducer 117, 127 outputs the output audio signal. E.g., the estimate of the REAG measure may be determined during a time at which output transducer 117, 127 outputs the output audio signal and/or based on a measured ear canal geometry of the user and/or based on a measured acoustic coupling of the hearing device with the environment, and/or the estimate of the REAG measure may be received, from a memory and/or via a data link with an external data source. E.g., output transducer 117, 127 may be switched on during determining the REAG measure.

E.g., at S11 and/or at S12, the estimate of the REOG measure and/or the REAG measure may be determined based on an in-the-ear audio signal indicative of a sound detected inside the ear canal. The in-the-ear audio signal may be provided, e.g., by an ear-canal microphone and/or by a probe, e.g., a sound tube, inserted into the ear canal. Operation S12 may be performed in succession to operation 511, and/or vice versa.

In some instances, operations S11, S12 may be repeated. E.g., operations S11, S12 may be repeated until the determined REOG measure and/or the determined REAG measure converges to a constant value. Operations 511, S12 may also be repeated, and an average value of the repeatedly determined REOG measure and/or the repeatedly determined REAG measure may be provided. In this way, an accuracy of the determined REOG measure and/or the determined REAG measure may be improved.

At operation S13, a measure of the RERG is determined based on estimate of the REOG measure and the REAG measure. For instance, the RERG measure may be indicative of a difference between the REOG measure and the REAG measure and/or the RERG measure may comprise a pair of values indicative of the REOG measure and the REOG measure. At operation 514, an operation of the hearing device is controlled depending on the RERG measure.

Figure 7:
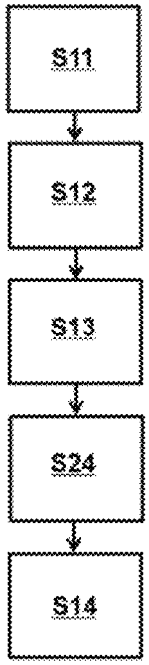

FIG. 7 illustrates a block flow diagram for another exemplary method of operating a hearing device configured to be worn at an ear of a user. At operation 524, after determining the RERG measure at 513, the RERG measure is compared to a threshold of the RERG measure. At operation S14, the operation of the hearing device is controlled depending on whether the RERG measure falls below or exceeds the threshold. E.g., when the RERG measure falls below the threshold, a notification may be outputted by notification output module 534 and/or a noise attenuator may be deactivated and/or changed by noise attenuation modifier 532. E.g., when the RERG measure exceeds the threshold, a noise attenuator may be activated and/or changed by noise attenuation modifier 532.

Figure 8:
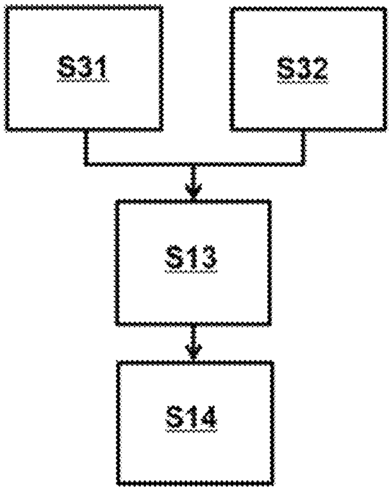

FIG. 8 illustrates a block flow diagram for another exemplary method of operating a hearing system comprising a first hearing device configured to be worn at a first ear of a user and a second hearing device configured to be worn at a second ear of a user. At operation S31, corresponding to operation S11 described above, a measure of the REOG is determined during a time at which output transducer 117, 127 of the first hearing device abstains from outputting the output audio signal. E.g., the REOG measure may be determined based on an in-the-ear audio signal indicative of a sound detected inside the ear canal of the first ear. At operation S32, corresponding to operation S12 described above, a measure of the REAG is determined during a time at which output transducer 117, 127 of the second hearing device outputs the output audio signal. E.g., the REAG measure may be determined based on an in-the-ear audio signal indicative of a sound detected inside the ear canal of the second ear.

In this regard, operations S31, S32 may be performed under the assumption that an SPL FF at the location of first hearing device 110, 120, 210 at the first ear is comparable, e.g., substantially equal, to an SPL FF at the location of second hearing device 110, 120, 210 at the second ear. To this end, the SPL FF at the first ear may be determined based on the input audio signal provided by input transducer 115 of first hearing device 110, 120, 210, the SPL FF at the second ear may be determined based on the input audio signal provided by input transducer 115 of second hearing device 110, 120, 210, and the SPL FF at the first and second ear may then be compared to verify this assumption. Furthermore, it may be assumed that an acoustic coupling provided by the first and second hearing device 110, 120, 210 is substantially equal. Furthermore, it may be assumed that an amplification of the input audio signal provided by processor 112, 122 included in first and second hearing device 110, 120, 210 is substantially equal. E.g., a hearing loss of the first ear to be compensated by first hearing device 110, 120, 210 may then be assumed to be comparable to a hearing loss of the second ear to be compensated by second hearing device 110, 120, 210.

In some instances, operations S31, S32 may be executed in parallel. In some instances, operations S31, S32 may be repeated. In some instances, operations S31, S32 may be followed by another operation in which the REOG is determined during a time at which output transducer 117, 127 of the second hearing device abstains from outputting the output audio signal, e.g., based on an in-the-ear audio signal indicative of a sound detected inside the ear canal of the second ear and/or the REAG measure is determined during a time at which output transducer 117, 127 of the first hearing device outputs the output audio signal, e.g., based on an in-the-ear audio signal indicative of a sound detected inside the ear canal of the first ear. E.g., those operations may be repeated until the determined REOG measure and/or the determined REAG measure converges to a constant value and/or an average value of the repeatedly determined REOG measure and/or the repeatedly determined REAG measure may be provided. Subsequently, at 513, a measure of the RERG is determined based on the REOG measure and the REAG measure, and, at 514, an operation of the first and/or second hearing device is controlled depending on the RERG measure.

While the principles of the disclosure have been described above in connection with specific devices and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of operating a hearing device configured to be at least partially inserted into an ear canal of a user, the method comprising:

receiving an input audio signal;

amplifying the input audio signal;

outputting, by an output transducer included in the hearing device, an output audio signal based on the amplified audio signal so as to stimulate the user's hearing;

determining, based on an estimate of a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and controlling an operation of the hearing device depending on the RERG measure.

2. The method of claim 1, further comprising at least one of:

determining, during a time at which the output transducer abstains from outputting the output audio signal, the estimate of the REOG measure;

determining, at least one of based on a measured ear canal geometry of the user or based on a measured acoustic coupling of the hearing device with an environment, the estimate of the REOG measure;

receiving, at least one of from a memory or via a data link with an external data source, the estimate of the REOG measure;

determining, during a time at which the output transducer outputs the output audio signal, the estimate of the REAG measure;

determining, at least one of based on a measured ear canal geometry of the user or based on a measured acoustic coupling of the hearing device with the environment, the estimate of the REAG measure; or receiving, at least one of from a memory or via a data link with an external data source, the estimate of the REAG measure.

3. The method of claim 1, wherein the hearing device comprises an ear-canal microphone configured to provide an in-the-ear audio signal indicative of a sound detected inside the ear canal, wherein at least one of the REOG measure or the REAG measure is determined based on the in-the-car audio signal.

4. The method of claim 3, wherein the hearing device comprises a sealing configured to reduce sound from an environment entering the ear canal, wherein the ear-canal microphone is positioned between the sealing and a tympanic membrane of the ear when the hearing device is at least partially inserted into the ear canal.

5. The method of claim 1, wherein the RERG measure is indicative of a difference between the REOG measure and the REAG measure.

6. The method of claim 1, wherein the RERG measure is determined for a plurality of frequency values.

7. The method of claim 1, further comprising:

comparing the RERG measure to a threshold of the RERG measure, wherein the operation is controlled depending on whether the RERG measure falls below or exceeds the threshold.

8. The method of claim 1, wherein the operation comprises at least one of:

outputting a notification to the user;

outputting data indicative of the RERG measure to a computing device; or outputting a control signal to a computing device, the control signal instructing the computing device to output a notification.

9. The method of claim 1, further comprising logging data indicative of the RERG measure over time.

10. The method of claim 1, wherein the operation comprises adjusting of a noise attenuator configured to attenuate noise in the input audio signal.

11. The method of claim 10, wherein the adjusting of the noise attenuator comprises at least one of:

adjusting a noise cancelling algorithm;

adjusting a beamformer;

adjusting an active noise cancelling (ANC); or adjusting an acoustic coupling of the hearing device with an environment.

12. The method of claim 1, further comprising determining, from the input audio signal, an occurrence of a current acoustic scene.

13. The method of claim 12, wherein the operation is controlled depending on the current acoustic scene.

14. The method of claim 1, wherein the REOG measure is determined for a plurality of frequency values.

15. A hearing device configured to be at least partially inserted into an ear canal of a user, the hearing device comprising:

an input transducer configured to provide an input audio signal;

a processor configured to amplify the input audio signal according to a predetermined transfer function; and an output transducer configured to output an output audio signal based on the amplified audio signal so as to stimulate the user's hearing, wherein the processor is further configured to determine, based on a measure of a Real Ear Occluded Gain (REOG) and a measure of a Real Ear Aided Gain (REAG), a measure of a Real Ear Reducible Gain (RERG) indicative of an amount by which noise contained in the input audio signal can be attenuated in the amplified audio signal; and control an operation of the hearing device depending on the RERG measure.

* * * * *